United States Patent [19]
Bilich et al.

[11] Patent Number: 5,764,547
[45] Date of Patent: Jun. 9, 1998

[54] METHOD AND APPARATUS FOR THREE-WAY POWER SWITCHING

[75] Inventors: James A. Bilich, Austin; Alan E. Brown, Georgetown, both of Tex.

[73] Assignee: Dell U.S.A. L.P., Austin, Tex.

[21] Appl. No.: 491,658

[22] Filed: Jun. 19, 1995

[51] Int. Cl.⁶ ........................................... G06F 1/00
[52] U.S. Cl. .................. 364/707; 345/211; 345/212; 395/750
[58] Field of Search ................ 364/707, 273.1, 364/273.2, 273.3, 273.5, DIG. 1; 395/750; 345/211; 71/212

[56] References Cited

U.S. PATENT DOCUMENTS

| | | | |
|---|---|---|---|
| 5,424,903 | 6/1995 | Schreiber | 361/166 |
| 5,483,260 | 1/1996 | Parks et al. | 345/156 |
| 5,513,359 | 4/1996 | Clark et al. | 395/750 |

OTHER PUBLICATIONS

Accuvue® Color Monitor HM-4921-D (User's Manual) Copyright© Hitachi, Ltd. 1995.

*Primary Examiner*—Reba I. Elmore
*Assistant Examiner*—Emmanuel L. Moise
*Attorney, Agent, or Firm*—Stanford & Bennett, L.L.P.

[57] ABSTRACT

A three-way power switch for turning on and off an entire computer system with a single switch. The host computer includes a soft-start circuitry for detecting display data channel (DDC) activation signals from a DDC-capable monitor. Thus, a toggle power switch on the monitor turns on and off the entire system, where the computer powers up or down based on the presence or absence, respectively, of the DDC signals. In a second embodiment, the monitor includes soft-start circuitry which detects the presence/absence of video signals from the host computer for powering up/down the monitor, respectively. Thus, in the second embodiment, a power switch either on the monitor or computer system is used to turn on and off the entire system. A third embodiment is similar to the second embodiment except bi-directional DDC2 signals are used as an activation signal to power up or down the monitor.

21 Claims, 3 Drawing Sheets

METHOD AND APPARATUS FOR THREE-WAY POWER SWITCHING

FIELD OF THE INVENTION

The present invention concerns turning on and off both a monitor and a host computer system with a single power switch.

DESCRIPTION OF THE RELATED ART

Most desktop personal computer (PC) systems have two or more switches to activate the host computer system, the display unit or monitor and other peripheral devices, as desired. It is rather inconvenient for the user to have to manipulate more than one switch to turn the entire computer system on. One common solution is a central power switching box with a single master switch and multiple switched power plugs. This solution, however, requires an additional box that must be placed either on a desktop or by the side of the desk at an often inconvenient location for routing the power cords. Furthermore, such a central power switch adds cost to the system.

It is noted that older monitors have an AC break power switch which must be manually toggled, so that it is not possible without substantial modification or without a central power switching box to remotely activate the monitor. Newer monitors sometimes include a momentary power switch where power is toggled on and off each time the switch is pressed and released. Such monitors typically include switching circuitry connected directly to AC power or a battery, which provides a flea power or a low power signal to switch logic for detecting the momentary switch being pressed. Such circuitry allows the monitor to be turned on and off remotely. This is often referred to as "secondary extra low voltage" or SELV, which will be referred to herein as "soft-start" capability.

Newer monitors also include a display data channel (DDC) which is an extension of the Video Electronic Standards Associations (VESA). The DDC provides a separate communication channel through the video cable and video connector for allowing communication between the monitor and the host system. The DDC is primarily intended to allow the monitor to send identity and status information to the host system. Several DDC standards are defined, including the DDC1 standard for uni-directional data flow from the monitor to the host system, where the monitor continuously transmits extended display identification (EDID) information. Another standard is DDC2, which is a bi-directional data channel based on Phillips $I^2C$ bus specification, where the host system can request EDID or video display interface (VDIF) information over the DDC2 channel. In addition, the DDC2 channel can act as a transparent channel for ACCESS.bus communication. The DDC2 includes at least 2 levels, including level AB and level B.

It is desired to power up and down the entire computer system by activating a single switch without significantly increasing the overall cost.

SUMMARY OF THE INVENTION

A system incorporating three-way power switching according to the present invention provides a way to activate the entire computer system including a monitor and host system using a single power switch. In one embodiment, the monitor includes an AC break power switch, where the monitor asserts an activation signal to a soft-start circuit within the host system unit, which in turn powers up the main power supply of the host system. The activation signal is preferably derived from the DDC signals continuously transmitted by the monitor to the computer, which enables the system unit to determine that system power is desired. Thus, when the monitor switch is turned off, the activation signals through the DDC channel are no longer asserted, and the computer system correspondingly shuts down. In this manner, a single switch may be used to power up or down the entire computer system.

In a second embodiment, the monitor includes soft-start capability where the monitor power switch is a momentary type switch. The entire system may be powered up or down from the monitor switch alone in a similar manner as the first embodiment, where the DDC signals serve as an activation signal for powering up the computer. In the second embodiment, however, the host system may also include a primary momentary switch for powering up or down the computer, where video logic within the computer asserts video signals which are sensed by soft-start circuitry within the monitor. In this manner, the soft-start circuitry in the monitor detects the video signals and automatically powers up. Thus, either the power switch of the monitor or the host system can be used to turn on the entire system. Furthermore, the entire system is turned off when either the monitor or the primary switch is pressed, where the host system shuts down when the DDC signals are no longer provided, and the monitor shuts down if the video signals are no longer provided. In this manner, either the monitor or the primary system unit power switch may be used to both turn on and off the entire computer system. It is noted that only one switch is needed in the second embodiment, so that either the monitor or the primary switch need be provided.

In a third embodiment, a bi-directional DDC2 channel is established between the monitor and the host system unit, where the DDC2 signals are used to power up and down the monitor rather than the video signals. In the third embodiment, a software protocol is preferably established where the DDC logic within the host system unit queries information from the monitor at regular intervals, where the monitor shuts down if these signals are not provided in a timeout fashion.

It is now appreciated that a three-way power switching method according to the present invention allows an entire computer system to be powered up or down using a single power switch. This provides added convenience to the user without significant extra cost of the overall system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
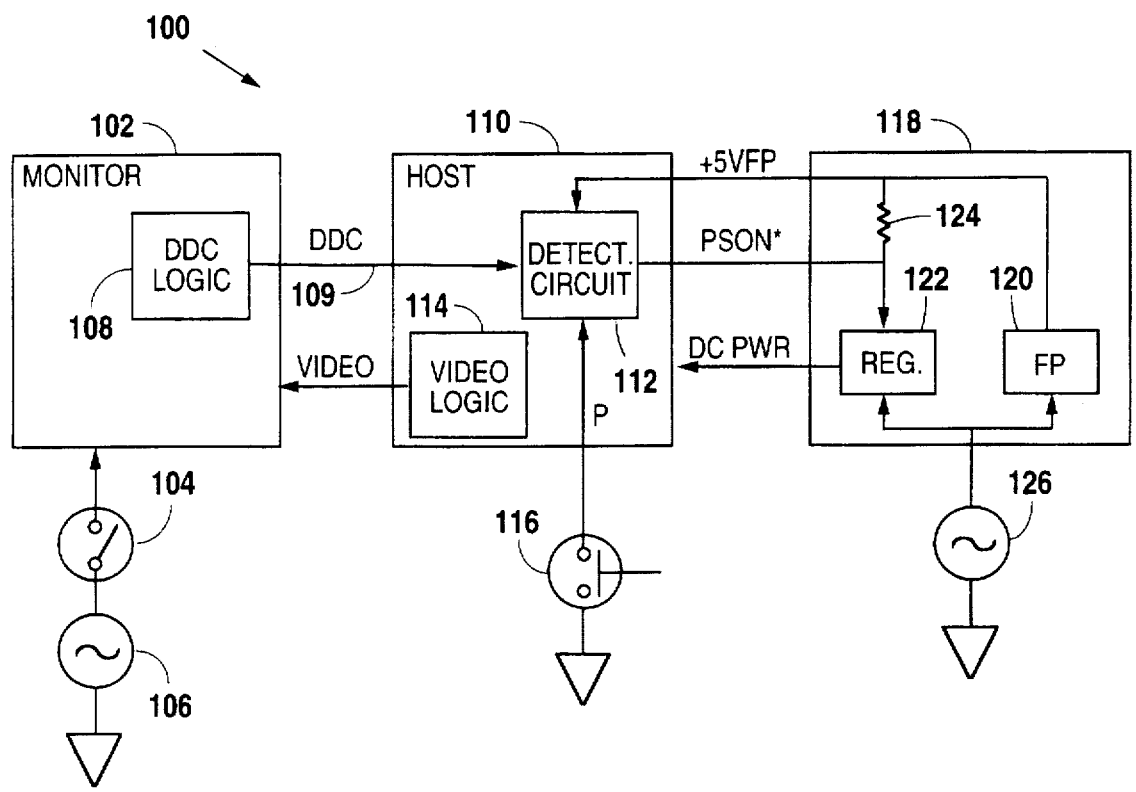
FIG. 1 is a block diagram illustrating one embodiment according to the present invention using a monitor with an AC break switch.

Referring now to FIG. 1, a block diagram is shown of a computer system 100 according to the present invention. A display unit or monitor 102 preferably includes a single-pole, single-throw power switch 104 for connecting AC power 106 to power up the monitor 102. The switch 104 is typically a mechanical toggle switch for turning on and off power in respective positions. The monitor 102 further includes a display data channel (DDC) and associated logic 108 for asserting DDC signals across a DDC channel 109 to a host system unit 110. In this case, the DDC signals are either unidirectional, or DDC1, or bi-directional, or DDC2, as desired. The monitor 102 receives VIDEO signals from the host system unit 110 for displaying information as known to those having skill in the art.

The primary system unit 110 includes a detection circuit 112 which receives the DDC signals and is also coupled to a momentary switch 116, coupled between the detection circuit 112 and ground. Video logic 114 is also provided within the host system unit 110 for asserting the VIDEO signals to the monitor 102 once powered up. The power switch 116 is preferably a momentary switch for momentarily grounding a power signal P to the detection circuit 112. The detection circuit 112 receives a 5 volt (V) low power signal, referred to as +5VFP, which is preferably a low power signal provided by an associated power supply 118. The power supply 118 may be located within the host system unit 110, or may be provided as a separate unit as desired. The +5VFP is a low power signal for providing power to the detection circuit 112 for detecting signals on the DDC channel 109, or for detecting the power switch 116 being pressed.

The detection circuit 112 provides a signal PSON* at its output to the power supply 118, which includes a pull-up resistor 124 coupled between the PSON* signal and the +5VFP signal. An asterisk (*) at the end of a signal name denotes negative logic, where the signal is considered asserted when low and deasserted when high. The output of the detection circuit 112 is preferably an open collector so that the resistor 124 pulls the PSON* signal high unless the detection circuit 112 asserts the PSON* signal low. The PSON* signal is also provided to a primary regulator 122 within the power supply 118 for providing the main DC power signals, collectively referred to as DC PWR, to power up the host system unit 110. The +5VFP signal is provided by a flea power circuit 120, which receives power from an AC source 126, where the AC source 126 is also connected to the primary regulator 122. In an alternative embodiment, the power supply 118 and/or the host system unit 110 includes a battery for providing a low power signal rather than the flea power circuitry 120 providing flea power.

Operation of the computer system 100 is now described. The flea power circuitry 120 always provides the low power +5VFP signal to the detection circuit 112, which continuously monitors the switch 116 and the DDC channel 109. Thus, the detection circuit 112 operates as a "soft-start" circuit for turning on a system from a signal. When powered off, the PSON* signal is pulled high through resistor 124 to the +5VFP signal, so that the regulator 122 is off. When a user presses the primary switch 116, the P signal is momentarily grounded and the detection circuit 112 asserts the PSON* signal low. The primary regulator 122 respondingly powers on and asserts the DC PWR signals to power up the host system unit 110. The host system unit 110 thus powers up, and activates the video logic 114, which begins asserting the VIDEO signals. In this case, however, the monitor 102 is not powered on since the switch 104 must be manually toggled to connect AC power 106 to turn on the monitor 102.

Alternatively, the user toggles the switch 104 to connect AC power 106 to the monitor 102, where the DDC logic 108 powers up and begins asserting a continuous stream of DDC signals on the DDC channel 109. The DDC signals serve as an activation signal for powering up the host system unit 110. In particular, the detection circuit 112 detects the DDC signals and correspondingly asserts the PSON* signal low, thereby activating the primary regulator 122 and powering up the power supply 118. The host system unit 110 receives the DC PWR signals from the primary regulator 122 and powers up. In this manner, only the switch 104 is toggled to turn on both the monitor 102 and the host system unit 110.

When the user toggles the switch 104 turning off the monitor 102, the DDC signals are no longer provided from the monitor 102. In this manner, when the continuous bitstream of activation signals from the DDC channel 109 are no longer provided, the detection circuit 112 releases the PSON* signal, which is then pulled high through resistor 124. The primary regulator 122 correspondingly shuts off, thereby shutting down the power supply 118, which turns off the host system unit 110. In this manner it is clear that the entire computer system 100 is turned on and off using the single power switch 104.

The switch 116 may be used to turn on and off the host system unit 110 as described before, but the monitor 102 remains on until the switch 104 is toggled off. It is noted that the primary power switch 116 is preferably a momentary switch, but could also be a toggle type switch for alternatively open circuiting and grounding the P signal. The detection circuit 112 is then designed to detect toggling of the power switch position, correspondingly toggling the PSON* signal as desired.

Figure 1A:
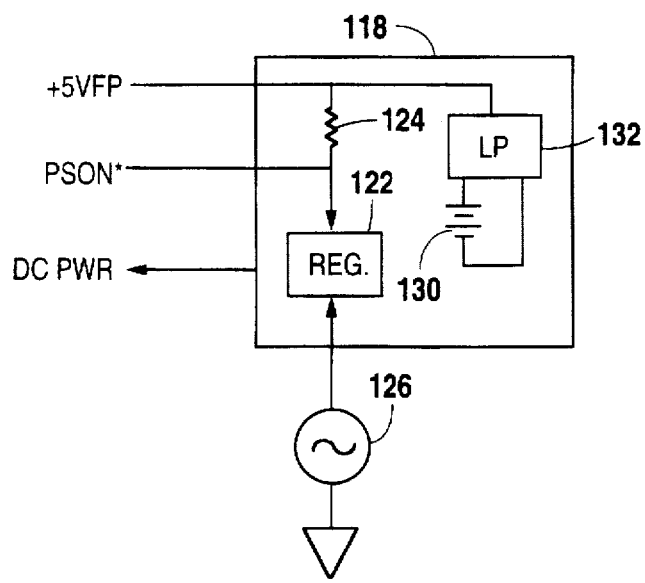
FIG. 1A is a block diagram illustrating an alternative embodiment of the power supply of FIG. 1 including a battery.

FIG. 1A illustrates an alternative embodiment of the power supply 118. The flea power circuit 120 is replaced by a low power circuit 132 coupled to a battery 130. The low power circuit 132 provides the +5VFP signal or similar low power signal to the detection circuit 112. Operation of the primary regulator 122 is the same. The low power circuit 132 and the battery 130 may replace the flea power circuit 120 in the embodiments described below.

Figure 2:
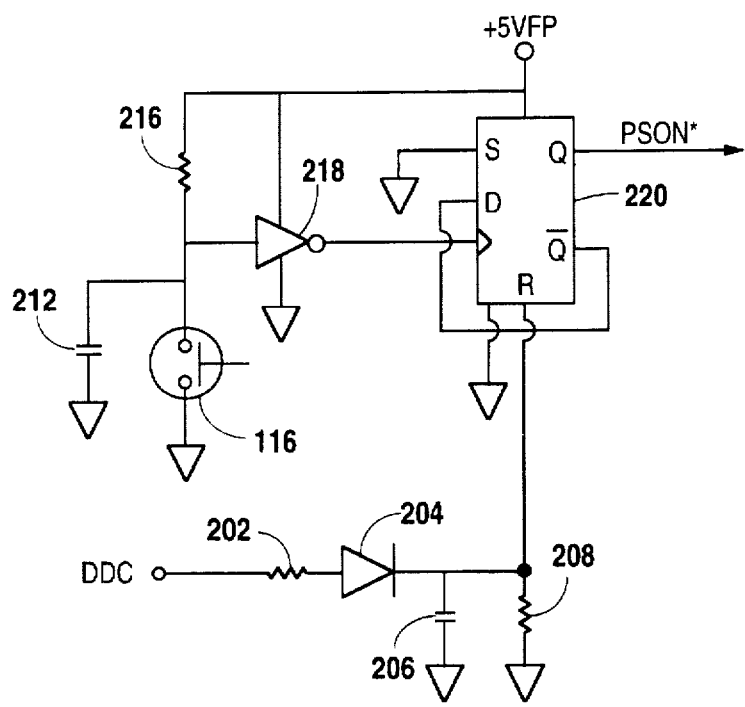
FIG. 2 is a more detailed diagram of the latch circuit of FIG. 1.

Referring now to FIG. 2, a schematic diagram is shown illustrating one embodiment of the detection circuit 112 of FIG. 1. The DDC signals are provided to one end of a resistor 202, having its other end connected to the anode of a diode 204, having its cathode connected to one end of a capacitor 206, to one end of a resistor 208 and to the reset input of a D-type flip-flop 220. The flip-flop 220 is preferably the MC 14013 by Motorola, having its set input coupled to ground, although other comparable flip-flops are contemplated, such as the standard 7474. The other ends of the capacitor 206 and the resistor 208 are connected to ground. The switch 116 is connected in parallel with a filter capacitor 212 and to one end of a resistor 216 and to the input of an inverter 218. The other end of the resistor 216 receives the +5VFP signal and the inverter 218 is powered by the +5VFP signal. The output of the inverter 218 is provided to the clock input of the flip-flop 220 receiving power from the +5VFP signal. The D input of the flip-flop 220 is connected to the inverted Q output, referred to as Q* of the flip-flop 220. The non-inverted Q output of the flip-flop 220 provides the PSON signal.

In operation, a continuous bitstream of DDC activation signals turns on the diode 204 and charges capacitor 206 for resetting the flip-flop 220. This correspondingly grounds the PSON* signal for turning on the power supply 118 and the host system unit 110. When the DDC signals are no longer provided, the capacitor 206 discharges through the resistor 208 and the flip-flop 220 pulls the PSON* signal high. The capacitor 212 is charged through the resistor 216 for asserting a high input to the inverter 218, so that its output is normally low. Each time the switch 116 is pressed, the input to the inverter 218 is grounded so that it asserts its output high clocking the flip-flop 220. When the switch 116 is released, the capacitor 212 charges so the inverter once again pulls its output low. The flip-flop 220 toggles the PSON* signal each time it is clocked. In this manner, the presence or absence of DDC signals on the DDC channel 109 or pressing of the switch 116 turns on and off the power supply 118.

Figure 3:
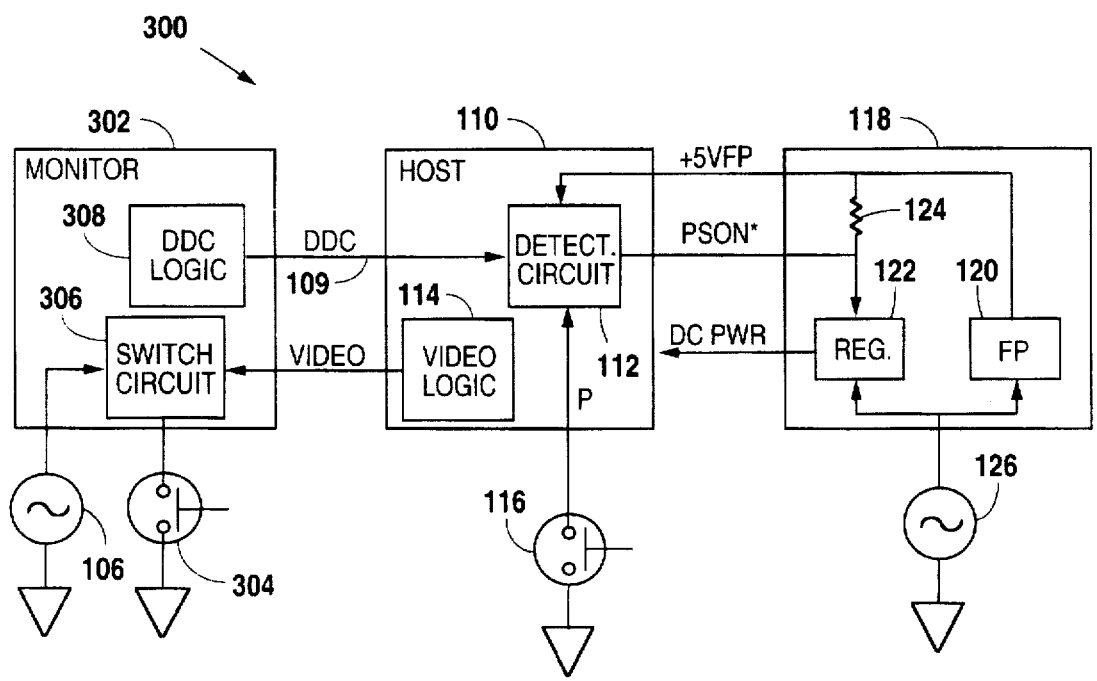
FIG. 3 is another embodiment according to the present invention using a monitor having soft-start capability.

Referring now to FIG. 3, another computer system 300 is shown according to an alternative embodiment of the present invention. The host system unit 110 and the power supply 118 operate in a similar manner and include similar components with identical reference numerals. A monitor 302 includes DDC logic 308 for asserting binary DDC signals on the DDC channel 109 in a similar manner as shown in FIG. 1. The monitor 302 further includes a soft-start switch circuit 306 coupled to AC power 106 and a momentary power switch 304 which receives the VIDEO signals. In particular, the switch circuit 306 converts energy from the AC source 106 for providing a low power signal to internal logic (not shown) for detecting the switch 304 and the VIDEO signals. Of course, the monitor 302 may alternatively include a battery for providing the low power signal. In this manner, alternative presses of the switch 304, or presence/absence of the VIDEO signals to the switch circuit 306 turns on and off the monitor 302. It is noted that the VIDEO signals serve as an activation signal by providing a continuous stream of data, which is detected by the switch circuit 306 for activating the monitor 302. When turned on, the monitor 302 activates the DDC logic 308, which asserts DDC signals on the DDC channel 109 to the detection circuit 112. The host system unit 110 powers up as described previously and turns on the video logic 114, which correspondingly begins transmitting the VIDEO signals.

A subsequent pressing of the switch 304 turns off the monitor 302, which correspondingly turns off the host system unit 110 and the power supply 118, since the DDC signals are no longer provided as described previously. Furthermore, while the computer system is turned on, subsequent pressing of the switch 116 turns off the host system unit 110, where the video logic 114 no longer transmits the VIDEO signals to the switch circuit 306 within the monitor 302. The switch circuit 306 preferably shuts down the monitor 302 when the VIDEO signals are no longer provided. In this manner, either the monitor power switch 304 or the system unit power switch 116 may be used to either power up or down the entire computer system 300.

It is noted that the PSON* signal could also be provided through the video cable to the monitor 302 for detection by the switch circuit 306. However, this would require modification of the video cable, which would be less desirable than using the VIDEO signals as described.

Figure 4:
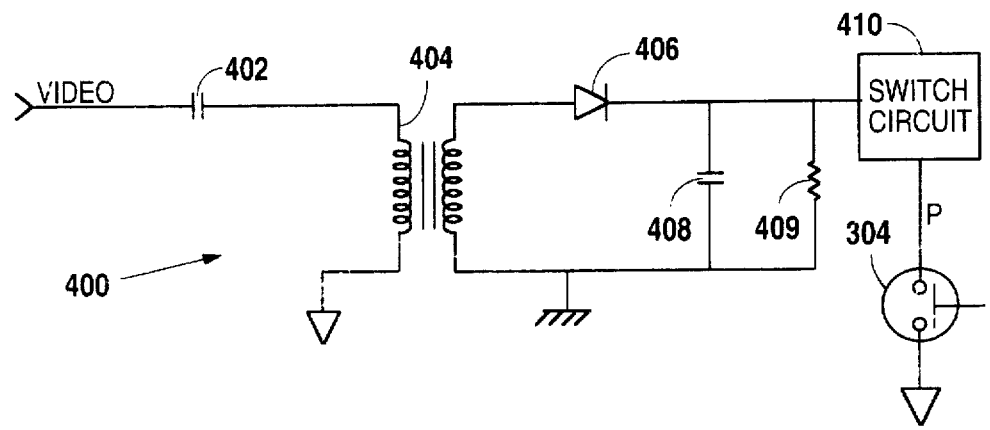
FIG. 4 illustrates a circuit which may be used to power up the monitor using video signals.

Referring now to FIG. 4, a detection circuit 400 is shown which could be included within the switch circuit 306 for detecting the VIDEO signals. The VIDEO activation signals are provided through a capacitor 402 and to the primary winding of a transformer 404, having its other end coupled to ground. The secondary winding of the transformer 404 is coupled between a secondary ground and the anode of a diode 406, having its cathode connected to one end of a capacitor 408, which has its other end coupled to secondary ground. A bleeder resistor 409 is coupled in parallel with the capacitor 408. A switch circuit 410 is connected to the cathode of the diode 406 and to a momentary power switch 304, where the switch circuit 410 detects either the VIDEO signals or the power switch 304 being pressed. In this manner, the monitor 302 is powered up and down based on the switch 304 and the VIDEO signals.

Figure 5:
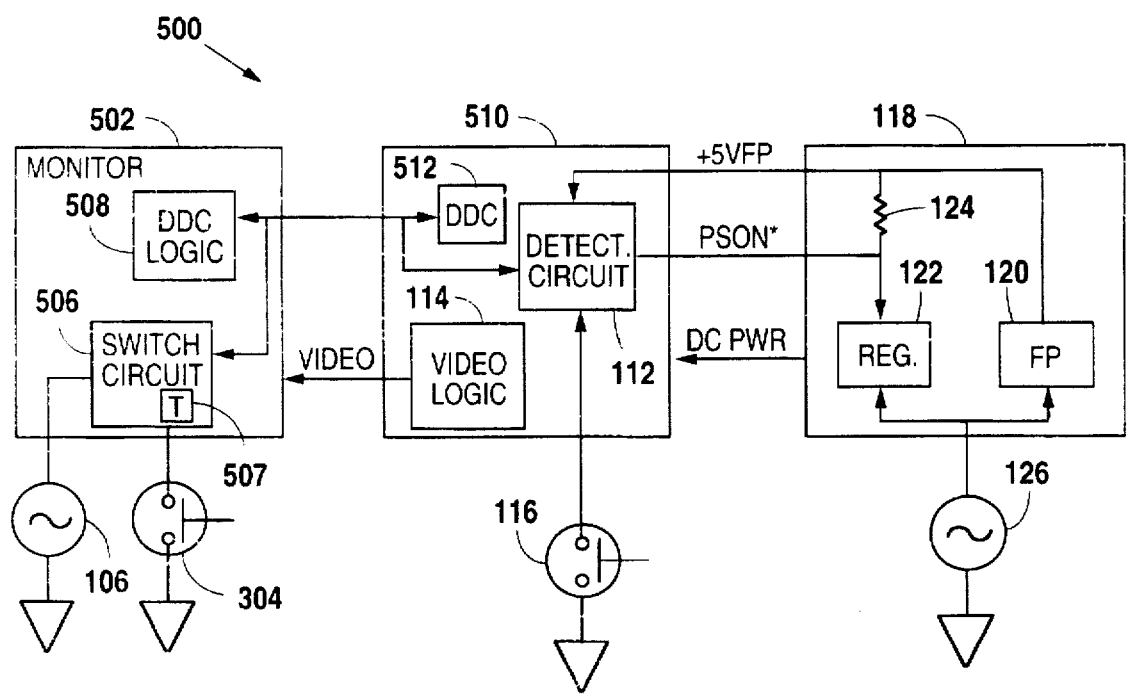
FIG. 5 is a block diagram of yet another embodiment according to the present invention using DDC2 signals for powering up and down the monitor.

Referring now to FIG. 5, another computer system 500 is shown according to another embodiment of the present invention. A monitor 502 is connected to a host system unit 510 in a similar manner as described in FIGS. 1 and 3. The monitor 502 is very similar to the monitor 302, except that the monitor 502 includes the DDC logic 508 for interfacing a bi-directional DDC2 channel 509. The DDC2 channel 509 is connected to a switch circuit 506, which is similar to the switch circuit 306, except that the DDC2 signals are used for activating the monitor 502. Thus, the switch circuit 506 turns on and off the monitor 502 when the power switch 304 is pressed or the DDC2 signals are present or absent from the host system unit 510.

The host system unit 510 includes DDC logic 512 for asserting DDC2 signals to the monitor 502. The DDC2 signals are also provided to the detection circuit 112 within the host system unit 510 and operate in a similar manner as described previously. Operation of the computer system 500 is similar to the computer system 300, except that the DDC2 signals are used to activate the monitor 502 rather than the VIDEO signals. In this manner, either the monitor power switch 304 or the host system unit power switch 116 may be used to turn on or off the entire computer system 500.

It is noted that the DDC2 signals from the DDC logic 512 are not necessarily continuous, but nonetheless can be periodic. Thus, a software protocol is preferably established within the host system unit 510 for asserting signals on the DDC2 signals to the monitor 502 at regular intervals. The switch circuit 506 detects the DDC2 signals and turns on and stays on while the DDC2 signals are provided at regular intervals. A timer 507 within the switch circuit is preferably used to establish a predetermined time period for this purpose. When the host system unit 510 is turned off, the DDC2 signals are no longer provided and the switch circuit 506 times out after the predetermined time period and shuts down the monitor 502.

It is appreciated that the present invention allows a single switch to be used to power up or down an entire computer system. The host computer includes a soft-start detection circuit for detecting DDC signals from the monitor and optionally a momentary switch. In one embodiment, the monitor includes a mechanical toggle switch for turning on and off the entire system. The host computer detects the presence/absence of the DDC activation signals and powers up/down accordingly. In a second embodiment, the monitor includes soft-start capability and powers up or down based on presence or absence, respectively, of the video activation signals from the host computer. Thus, either a momentary switch on the host system unit or the monitor may be used to power up or down the entire system. A third embodiment is similar to the second except that signals across a bi-directional DDC2 channel are detected by the monitor for powering up or down rather than the video signals. A protocol is established in the third embodiment so that the host computer requests video information on a regular basis across the DDC2 channel. The monitor powers down if video information is not requested after a predetermined period of time.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer system, comprising:

a monitor which asserts an activation signal while powered on;

a switch coupled to said monitor for turning on and off said monitor; and a host computer coupled to said monitor, comprising:

a detection circuit receiving said activation signal for asserting a start signal while said activation signal is provided; and a soft-start power source receiving said start signal for turning on and off said host computer based on said start signal.

2. The computer system of claim 1, wherein said monitor includes a display data channel for continually asserting display data signals as said activation signal while powered on.

3. The computer system of claim 1, wherein said switch is a toggle switch for coupling AC power to said monitor.

4. The computer system of claim 1, wherein said detection circuit comprises:

a filter including a capacitor which is charged while said activation signal is provided and discharged when said activation signal is absent; and a transistor coupled to said capacitor for switching based on the charge of said capacitor.

5. The computer system of claim 4, wherein said filter includes:

a diode coupled to said capacitor for rectifying said activation signal; and a resistor coupled to said capacitor for discharging said capacitor.

6. The computer system of claim 4, wherein said transistor comprises a field-effect transistor.

7. The computer system of claim 1, wherein said soft-start power source comprises:

a low power signal source for providing power to said detection circuit while said host computer is powered off.

8. The computer system of claim 7, wherein said low power signal source receives AC power.

9. The computer system of claim 7, wherein said low power signal source comprises a battery.

10. The computer system of claim 1, further comprising:

a second switch; and a latch circuit coupled to said second switch for asserting said start signal in response to said second switch being pressed.

11. The computer system of claim 10, wherein said second switch is a momentary switch.

12. The computer system of claim 1, further comprising: said host computer including:

a second switch coupled to said soft-start power source that turns on and off said host computer; and activation circuitry that asserts a monitor activation signal when said host computer is powered on; and said monitor including soft-start circuitry that receives said monitor activation signal and powers up said monitor when said monitor activation signal is provided and powers down said monitor when said monitor activation signal is not provided.

13. The computer system of claim 12, wherein said activation circuitry comprises video logic that asserts video signals to said monitor while said host computer is powered on.

14. The computer system of claim 13, wherein said soft-start circuitry includes a transformer sensing circuit that senses said video signals.

15. The computer system of claim 14, wherein said transformer sensing circuit comprises:

a transformer having a primary receiving said video signals and a secondary;

a diode coupled to said secondary of said transformer; and a capacitor coupled to said diode, wherein said capacitor is charged while said video signals are provided but is otherwise discharged.

16. The computer system of claim 12, wherein said activation circuitry comprises:

display data channel logic that asserts a display data signal to said monitor.

17. The computer system of claim 16, wherein said soft-start circuitry turns on said monitor while said display data signal is provided and turns off said monitor when said display data signal is not provided.

18. A method of turning on a computer system, the computer system including a monitor with display data channel capability and a host computer including soft-start capability, the method comprising the steps of:

turning on the monitor in response to a power switch coupled to the monitor;

the monitor providing a display data signal while turned on; and turning on the host computer in response to the display data signal being provided.

19. The method of claim 18, further comprising the steps of:

turning off the monitor in response to the power switch; and turning off the host computer while the display data signal is not provided.

20. The method of claim 18, further comprising the steps of:

turning on the host computer in response to a second power switch coupled to the host computer;

the host computer providing an activation signal while turned on; and turning on the monitor in response to the activation signal from the host computer.

21. The method of claim 20, further comprising the steps of:

turning off the host computer in response to the second power switch coupled to the host computer; and turning off the monitor in response to the activation signal no longer being provided.

* * * * *